United States Patent
Uchida

(10) Patent No.: US 11,989,444 B2
(45) Date of Patent: May 21, 2024

(54) MEMORY CONTROLLER

(71) Applicant: Kioxia Corporation, Tokyo (JP)

(72) Inventor: Daisuke Uchida, Fujisawa Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/336,443

(22) Filed: Jun. 16, 2023

(65) Prior Publication Data

US 2023/0333773 A1 Oct. 19, 2023

Related U.S. Application Data

(63) Continuation of application No. 17/321,188, filed on May 14, 2021, now Pat. No. 11,726,700, which is a continuation of application No. 16/552,821, filed on Aug. 27, 2019, now Pat. No. 11,042,321.

(30) Foreign Application Priority Data

Mar. 4, 2019 (JP) ................................ 2019-038260

(51) Int. Cl.
G06F 3/06 (2006.01)
(52) U.S. Cl.
CPC .......... G06F 3/0655 (2013.01); G06F 3/0604 (2013.01); G06F 3/0679 (2013.01); *G06F 3/067* (2013.01)
(58) Field of Classification Search
None
See application file for complete search history.

(56) References Cited

U.S. PATENT DOCUMENTS

| 10,061,719 | B2 | 8/2018 | Morris et al. |
| 2013/0073795 | A1 | 3/2013 | Hasegawa |
| 2013/0138900 | A1* | 5/2013 | Ishihara ............... G06F 3/0685 711/158 |
| 2016/0065484 | A1 | 3/2016 | Suzuki et al. |
| 2017/0091108 | A1 | 3/2017 | Arellano et al. |
| 2017/0279730 | A1 | 9/2017 | Calin et al. |

(Continued)

FOREIGN PATENT DOCUMENTS

| EP | 1313274 A2 | 5/2003 |
| JP | 5547154 B2 | 7/2014 |
| WO | 2019/072397 A1 | 4/2019 |

*Primary Examiner* — Brian R Peugh
(74) *Attorney, Agent, or Firm* — Kim & Stewart LLP

(57) ABSTRACT

A memory controller that controls a nonvolatile memory in response to commands from a host includes a normal transfer queue and a priority transfer queue, a transfer packet priority determination unit, a transfer queue selector, and a transfer packet selector. The transfer packet priority determination unit determines whether a transfer packet is a priority packet based on transmission information of the transfer packet. The transfer queue selector selects the priority transfer queue and stores the transfer packet in the priority transfer queue if the transfer packet is determined as a priority packet, and selects the normal transfer queue and stores the transfer packet in the normal transfer queue if the transfer packet is not determined as a priority packet. The transfer packet selector transfers to the host a priority packet stored in the priority transfer queue preferentially with respect to a normal packet stored in the normal transfer queue.

20 Claims, 11 Drawing Sheets

(56) References Cited

U.S. PATENT DOCUMENTS

| | | |
|---|---|---|
| 2018/0186816 A1 | 7/2018 | Tadaoka et al. |
| 2018/0331960 A1 | 11/2018 | Browne et al. |
| 2020/0142819 A1 | 5/2020 | Shaeffer et al. |
| 2020/0174699 A1 | 6/2020 | Cho |

* cited by examiner

| PACKET TYPE IDENTIFI- CATION CODE | PACKET SIZE | TRANS- ACTIO N SIZE | ACCESS AREA OF TRANSFER DATA | HOST IDENTIFI- CATION CODE | DATA |

MEMORY CONTROLLER

CROSS-REFERENCE TO RELATED APPLICATION(S)

This application is a continuation of U.S. patent application Ser. No. 17/321,188, filed on May 14, 2021, now U.S. Pat. No. 11,726,700, which is a continuation of U.S. patent application Ser. No. 16/552,821, filed on Aug. 27, 2019, now U.S. Pat. No. 11,042,321, issued on Jun. 22, 2021, which is based upon and claims the benefit of priority from Japanese Patent Application No. 2019-038260, filed on Mar. 4, 2019, the entire contents of which are incorporated herein by reference.

FIELD

Embodiments described herein relate generally to a memory controller.

BACKGROUND

A host and a memory device transmit/receive commands and data through a communication interface. When a command is issued from the host to the memory device, and multiple transactions are executed, the CPU (central processing unit) in the memory device is able to control an order of executing the transactions.

However, when there exists one interface for returning responses to the multiple transactions from the memory device to the host, the responses cannot be returned at the same time.

In such a case, responses to the transactions may be returned in order using the FIFO (First In First Out) method, but the time for executing all of the transactions may not be optimal.

For example, in order for the memory device to receive write data with respect to a write transaction that conforms to a universal flash storage (UFS) standard, it is necessary to transmit a ready to transfer (RTT) UFS protocol information unit (UPIU).

The RTT UPIU cannot be transmitted during a long data transfer such as a transfer of read data. This causes a delay in receiving write data. Under the circumstance, when the depth of a queue of the host is shallow, the next command cannot be received from the host as long as responses to the command issued from the host are not returned from the memory device.

Further, since the host requests that multiple pieces of transfer data of a long transaction be issued, data of a subsequent short transaction cannot be issued. As a result, the memory device cannot receive the next command.

DETAILED DESCRIPTION

Figures 1, 2:
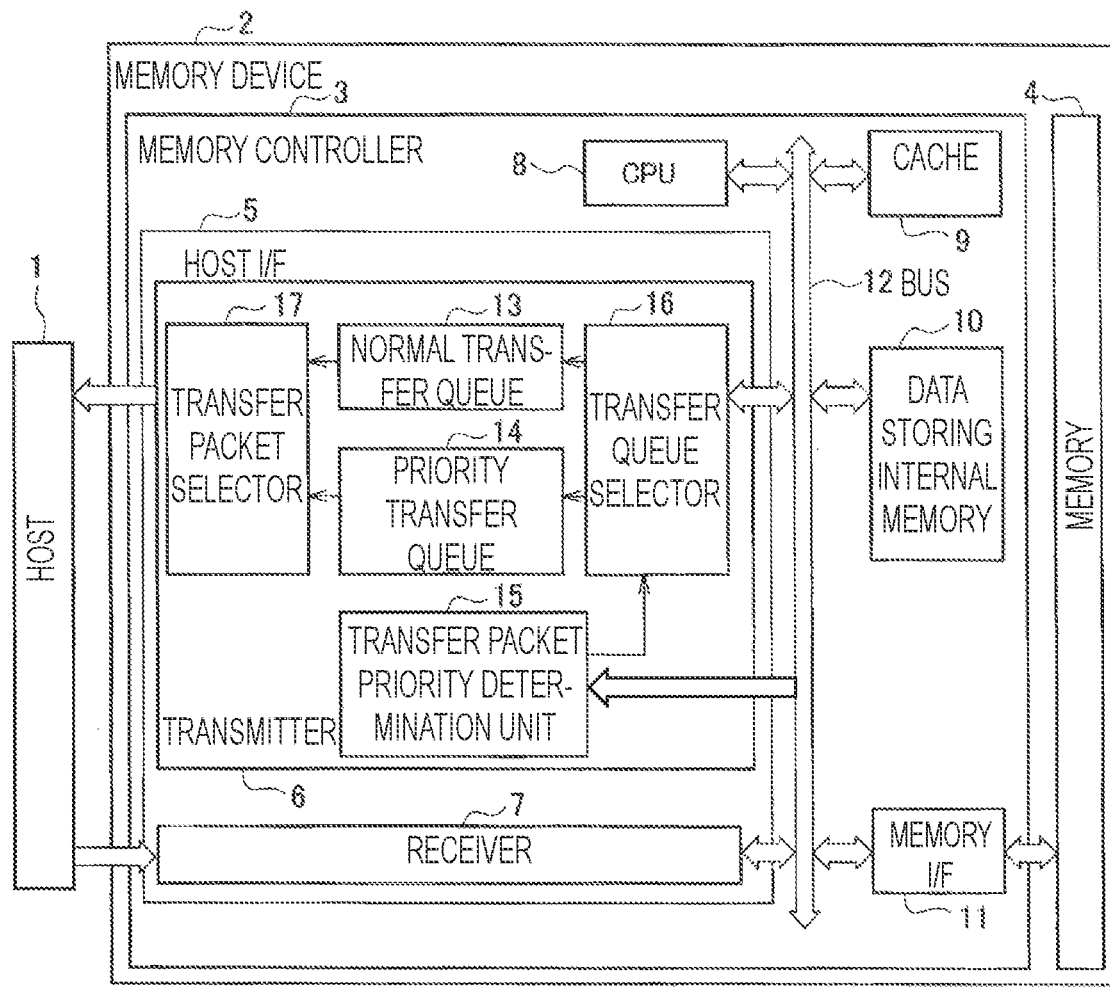
FIG. 1 is a block diagram of a memory device of a first embodiment.
FIG. 2 illustrates a data structure of a packet that is modified according to the first embodiment.

Embodiments provide a memory controller capable of reducing the overall time for processing transactions.

In general, according to one embodiment, a memory controller is provided for controlling a nonvolatile memory and performing operations on the nonvolatile memory in response to a request for executing multiple transactions from a host. The memory controller includes a normal transfer queue and a priority transfer queue, a transfer packet priority determination unit, a transfer queue selector, and a transfer packet selector. The transfer packet priority determination unit determines whether a transfer packet is a priority packet based on transmission information of the transfer packet. The transfer queue selector selects the priority transfer queue and stores the transfer packet in the priority transfer queue if the transfer packet is determined as a priority packet, and selects the normal transfer queue and stores the transfer packet in the normal transfer queue if the transfer packet is not determined as a priority packet. The transfer packet selector transfers to the host a priority packet stored in the priority transfer queue preferentially with respect to a normal packet stored in the normal transfer queue.

The transfer packet priority determination unit determines whether a transfer packet is a priority packet that needs to be preferentially transmitted, based on transmission information of the transfer packet, with respect to an order of transmitting responses to the request for executing multiple transactions. The transfer queue selector selects the priority transfer queue and stores the priority packet in the priority transfer queue when the transfer packet is the priority packet, and selects the normal transfer queue and stores the transfer packet in the normal transfer queue when the transfer packet is not the priority packet.

The transfer packet selector checks a storage state of the priority transfer queue and the normal transfer queue to select a transfer packet. When a transfer packet is stored in the priority transfer queue, the transfer packet selector selects and transfers the transfer packet of the priority transfer queue to the host in preference to a transfer packet of the normal transfer queue.

Hereinafter, a memory device including a memory controller of embodiments will be described in detail with reference to the drawings.

The drawings referred to hereinbelow are schematic. In the following descriptions, elements having the same function and configuration will be denoted by same reference numerals.

First Embodiment (Configuration of Memory Device)

FIG. 1 is a block diagram of a memory device according to a first embodiment. A memory device 2 is connected to a host 1. The host 1 and the memory device 2 transmit/receive commands and data through a communication interface.

The host 1 issues a command to the memory device 2. The host 1 includes hardware and software for accessing the memory device 2.

The memory device 2 includes a memory 4 and a memory controller 3 that controls the memory 4. The memory controller 3 receives the command from the host 1 and returns a response to the command, to the host 1. The memory 4 writes/reads data in units of writing, each of which contains multiple bits. The memory 4 erases data in units of erasing, each of which includes multiple units of writing.

The memory device 2 is, for example, a universal flash storage (UFS). The memory 4 is a NAND type flash memory that stores data in a nonvolatile manner.

The memory 4 writes/reads data in units of a page. A page includes a memory space of a set of multiple connected memory cells, and is assigned a unique physical address.

The memory 4 includes a memory cell array having multiple memory cells, and a page buffer. Input/output of data is performed between the page buffer and the memory cells. The page buffer stores data corresponding to one page. When data is written into the memory 4, the memory controller 3 transmits a write command, a page address indicating a write destination, and write data corresponding to one page, to the memory 4.

The memory 4 stores the write data from the memory controller 3 in the page buffer, and writes the write data in the page buffer into memory cells designated by the page address. When the write operation into the memory cells is started, the memory 4 outputs a busy signal to the memory controller 3. After the busy signal is switched to a ready signal, the same operation as described above is performed on the next page address.

When data is read from the memory 4, the memory controller 3 transmits a read command and a page address indicating a read destination, to the memory 4. The memory 4 reads data corresponding to one page from memory cells designated by the page address, into the page buffer. When the read operation from the memory cell is started, the memory 4 outputs a busy signal to the memory controller 3. After the busy signal is switched to a ready signal, the read data stored in the page buffer is output to the memory controller 3.

(Configuration of Memory Controller)

The memory controller 3 receives a request for executing multiple transactions from the host 1. The memory controller 3 instructs, for example, read, write, and erase to the memory 4 in response to the request for executing multiple transactions from the host 1. The memory controller 3 writes the data instructed to be written from the host 1, into the memory 4, and reads the data instructed to be read by the host 1, from the memory 4 to transmit the read data to the host 1.

Further, the memory controller 3 manages the memory space in the memory 4. The management includes a management of addresses and a management of the state of the memory 4. Mapping of addresses refers to mapping of a logical address to a physical address. The physical address corresponds to a storage area provided by the memory 4. Specifically, when write is instructed, the memory controller 3 manages a logical address of a write destination of the data instructed to be written and a physical address of a storage area in the memory where the data is written, using an address conversion table.

The memory controller 3 acquires a physical address associated with a specific logical address, and reads data from the storage area of the acquired physical address. The management of the state of the memory 4 includes management of the storage area of the memory 4, wear leveling, garbage collection (compaction), and refresh.

The memory controller 3 includes the following circuits: a host interface (I/F) 5, a transmitter 6, a receiver 7, a CPU 8, a cache 9, a data storing internal memory 10, and a memory interface (I/F) 11.

The memory controller 3 executes some or all of the respective functions of the host I/F 5, the transmitter 6, the receiver 7, the CPU 8, the cache 9, the data storing internal memory 10, and the memory I/F 11 when a firmware (program) is executed by the CPU 8.

The host I/F 5, the transmitter 6, the receiver 7, the CPU 8, the cache 9, the data storing internal memory 10, and the memory I/F 11 are connected to each other by a bus 12.

The host I/F 5 is connected to the host 1 and performs a communication with the host 1. For example, the host I/F 5 transfers commands and data received from the host 1, to each of the CPU 8, the cache 9, and the data storing internal memory 10.

The cache 9 stores table information for converting a logical address designated by the host 1 into a physical address of the memory 4. The data storing internal memory 10 has a function of a buffer and temporarily stores write data and read data with respect to the memory 4. A ROM (not illustrated) stores control programs or the like executed by the CPU 8.

The memory I/F 11 is connected to the memory 4 and performs a communication with the memory 4. The memory I/F 11 transmits/receives signals according to a NAND interface. The signals according to the NAND interface include, for example, various control signals and input/output signals. The input/output signals include commands, write data and read data, address signals, and various management data.

The CPU 8 controls the host I/F 5, the cache 9, the data storing internal memory 10, and the memory I/F 11. The CPU 8 manages the state of the memory 4 while controlling the cache 9, the data storing internal memory 10, and the memory I/F 11, during the time of writing and reading.

The host I/F 5 includes a transmitter 6 that transmits data to the host 1 and a receiver 7 that receives, for example, commands and data from the host 1. The transmitter 6 includes a normal transfer queue 13 and a priority transfer queue 14, a transfer packet priority determination unit 15, a transfer queue selector 16, and a transfer packet selector 17.

The transfer packet priority determination unit 15, the transfer queue selector 16, and the transfer packet selector 17 may be implemented as either logic circuits or firmware (program) running on a processor.

The normal transfer queue 13 and the priority transfer queue 14 include storage units. In a state where a request for executing multiple transactions is made from the host 1, the transfer packet priority determination unit 15 determines whether a transfer packet is a priority packet that needs to be preferentially transferred, based on a transmission request from the CPU 8 and transmission information included in the header of the transfer packet, with respect to an order of transmitting responses to the request for executing multiple transactions. The transmission information refers to information such as a packet type identification code, a packet size, a transaction size, an access area of transfer data, and a host identification code, all of which are represented in FIG. 2.

When the transfer packet is a priority packet, the transfer queue selector 16 selects the priority transfer queue 14 and stores the priority packet in the priority transfer queue 14. When the transfer packet is not a priority packet, the transfer queue selector 16 selects the normal transfer queue 13 and stores the transfer packet in the normal transfer queue 13.

The transfer packet selector 17 checks the state of the priority transfer queue 14 and the normal transfer queue 13, to select a transfer packet. When a transfer packet is stored in the priority transfer queue 14, the transfer packet selector 17 selects and transfers the transfer packet of the priority transfer queue 14 to the host 1, preferentially with respect to a transfer packet of the normal transfer queue 13.

As illustrated in FIG. 2, a transfer packet is configured to have a packet type identification code, a packet size, a transaction size, an access area of transfer data, a host identification code, and data. All of this information, including the packet type identification code, the packet size, the transaction size, and the access area of transfer data, is provided in the header of a transfer packet. The packet size refers to a size of data to be transferred. The transaction size refers to a size of all data required by one transaction.

(Priority Determination Process According to Type of Transfer Packet)

Figure 3:
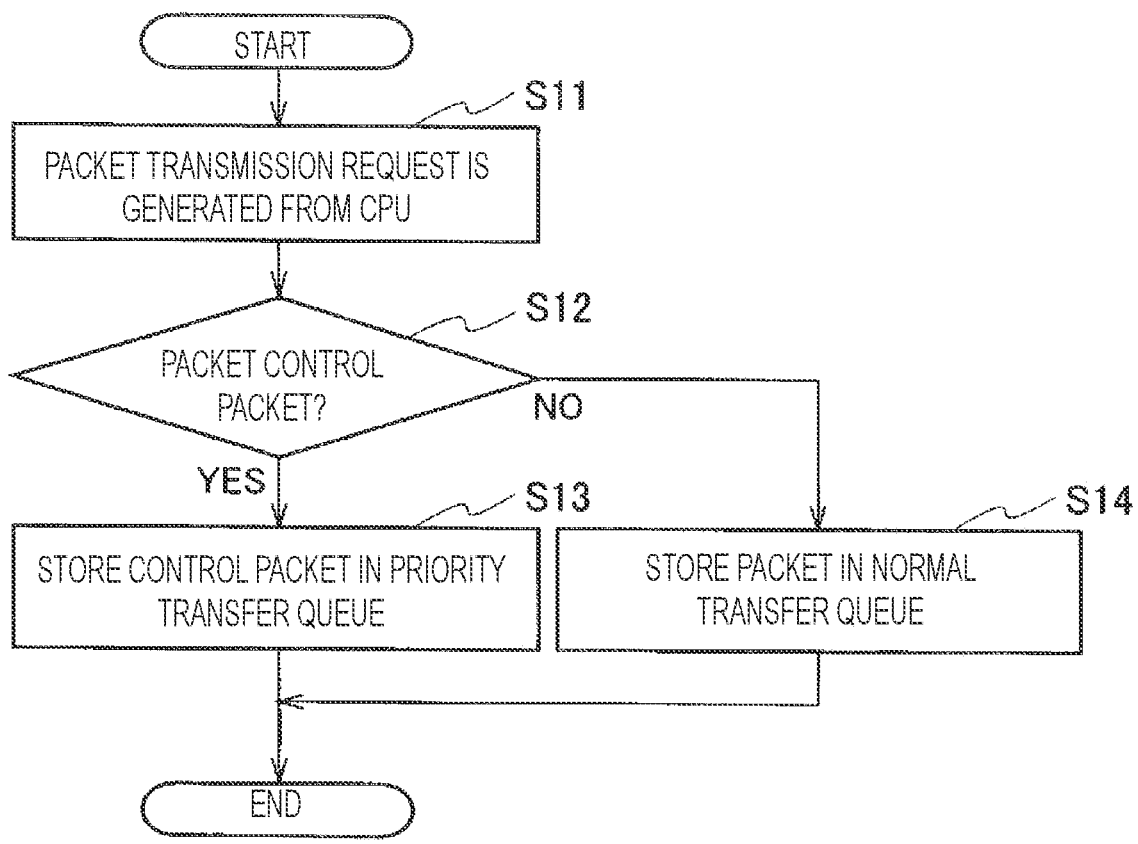
FIG. 3 is a flowchart illustrating a priority transfer process according to a type of a transfer packet, in a memory controller of the first embodiment.
Figure 4:
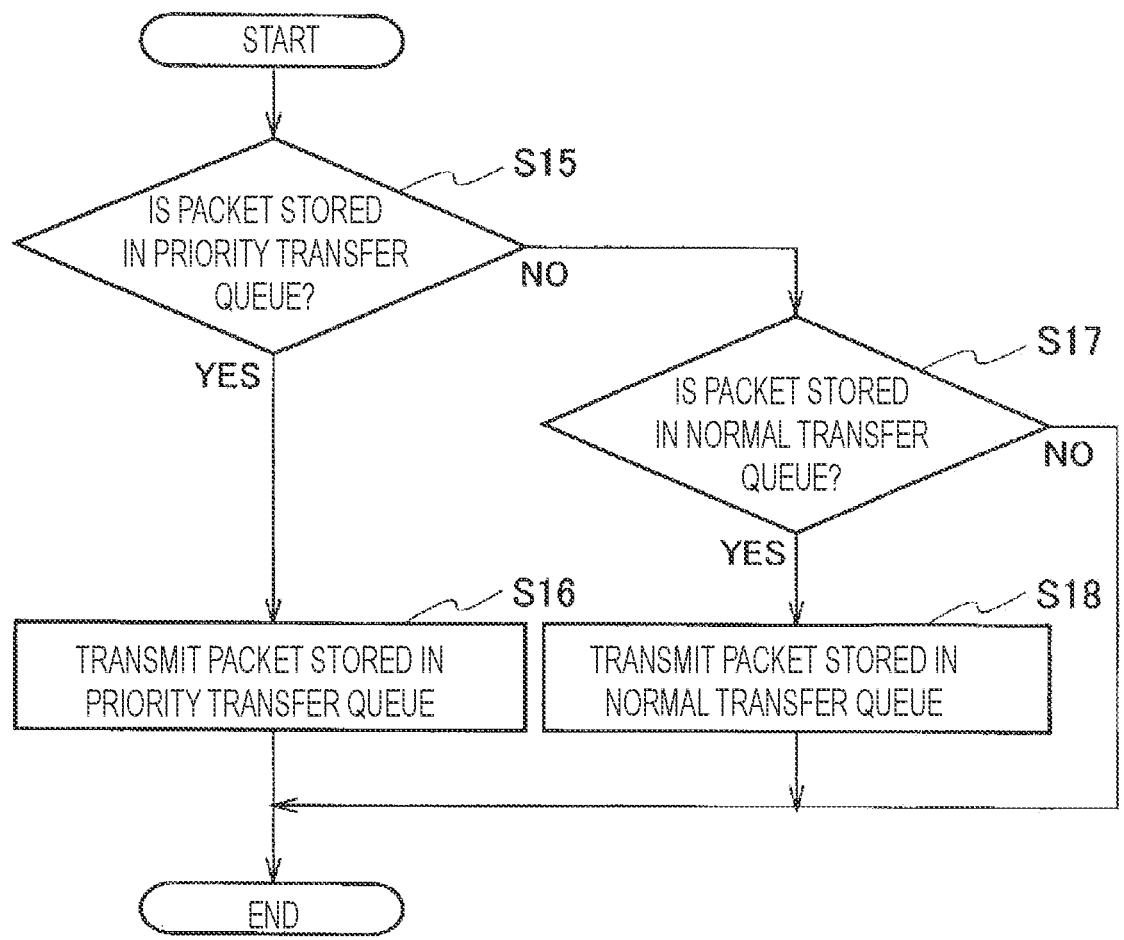
FIG. 4 is a flowchart illustrating a transfer packet selection process in the memory controller of the first embodiment.

Next, a priority determination process according to a type of a transfer packet in the memory device of the first embodiment configured as described above will be described in detail with reference to FIGS. 3 and 4.

First, the host 1 transmits a request for executing multiple transactions such as a read command and a write command, to the memory device 2. In response, the CPU 8 in the memory controller 3 receives the request for executing multiple transactions transmitted by the host 1.

Figure 5:
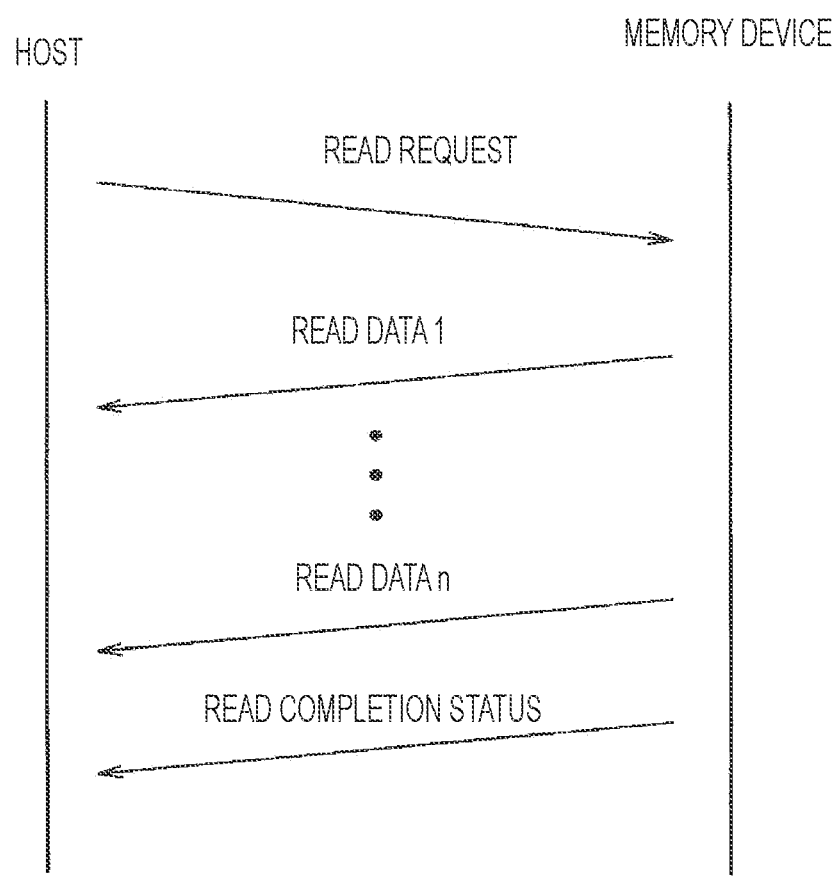
FIG. 5 is a control sequence illustrating a transfer of read data in response to a read request from a host to a memory device according to the first embodiment.

As illustrated in FIG. 5, when a read command is received, the memory controller 3 reads data from the memory 4 and transfers the data to the host 1. When the transfer of all read data in response to the read request is completed, a read completion status is transmitted.

Figure 6:
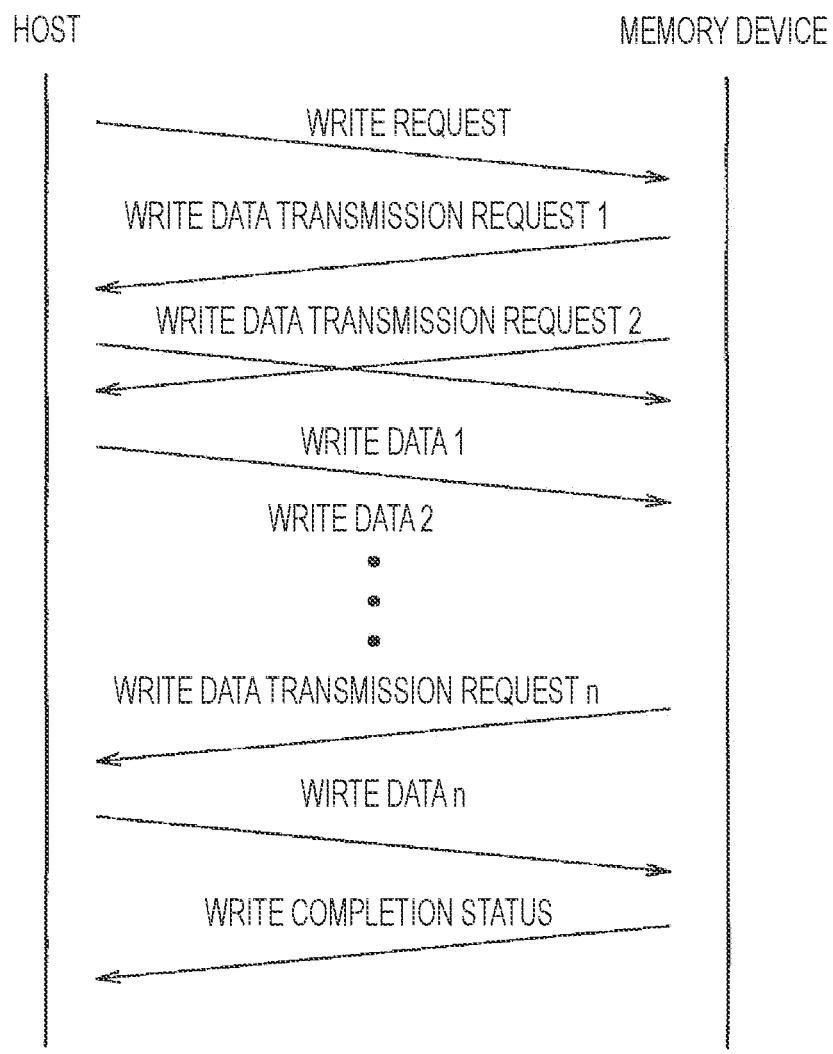
FIG. 6 is a control sequence illustrating a write data transmission request in response to a write request from the host to the memory device according to the first embodiment.

As illustrated in FIG. 6, when a write command is received, the memory controller 3 transmits a write data transmission request to the host 1 in order to receive write data from the host 1. In a UFS, the write data transmission request is RTT UPIU. When the write data transmission request is received, the host 1 transmits the write data to the memory device 2. When the write data is received, the memory controller 3 writes the data into the memory 4. The write data transmission request and the reception of the write data are repeated according to the size of the write request included in the write command until all of the write data are received and written into the memory 4. At that time, a write completion status is transmitted. In the UFS, the read completion status or the write completion status is sent as a Response UPIU to the host 1. In the above-described manner, the CPU 8 generates a packet transmission request in response to the request for executing multiple transactions, and sends the transmission request to the transmitter 6 (step S11).

The transfer packet priority determination unit 15 determines whether a type of a transfer packet is a control packet such as, for example, the RTT UPIU or Response UPIU, based on the packet transmission request from the CPU 8 and the transmission information included in the header of the transfer packet, with respect to an order of transmitting responses to the multiple transactions (step S12).

When it is determined that the transfer packet is a control packet, the transfer queue selector 16 selects the priority transfer queue 14 and stores the control packet in the priority transfer queue 14 (step S13).

Meanwhile, when it is determined that the transfer packet is a normal packet, and not the control packet, the transfer queue selector 16 selects the normal transfer queue 13 and stores the transfer packet in the normal transfer queue 13 (step S14).

Next, the transfer packet selector 17 determines whether a packet is stored in the priority transfer queue 14 (step S15). When it is determined that a packet is stored in the priority transfer queue 14, the transfer packet selector 17 transmits the packet stored in the priority transfer queue 14 to the host (step S16), and the process is ended.

Meanwhile, the transfer packet selector 17 determines whether a packet is stored in the normal transfer queue 13 (step S17).

When it is determined that a packet is stored in the normal transfer queue 13, the transfer packet selector 17 transmits the packet stored in the normal transfer queue 13 to the host 1 (step S18), and the process is ended.

Next, a data transmitting order in a memory device of related art will be described with reference to part (a) of FIG. 7. In the example illustrated in part (a) of FIG. 7, a receiver receives a read command, and then, receives a write command from the host.

Next, a transmitter transmits long read data to the host in response to the read command. Then, the transmitter transmits a write data transmission request to the host 1 in response to the write command. Then, the receiver receives write data from the host.

In the process described above, the write data transmission request cannot be transmitted during the transfer of the long read data. As a result, the reception of the write data is delayed.

Next, a data transmitting order in the memory device of the first embodiment will be described with reference to part (b) of FIG. 7.

Figure 7:
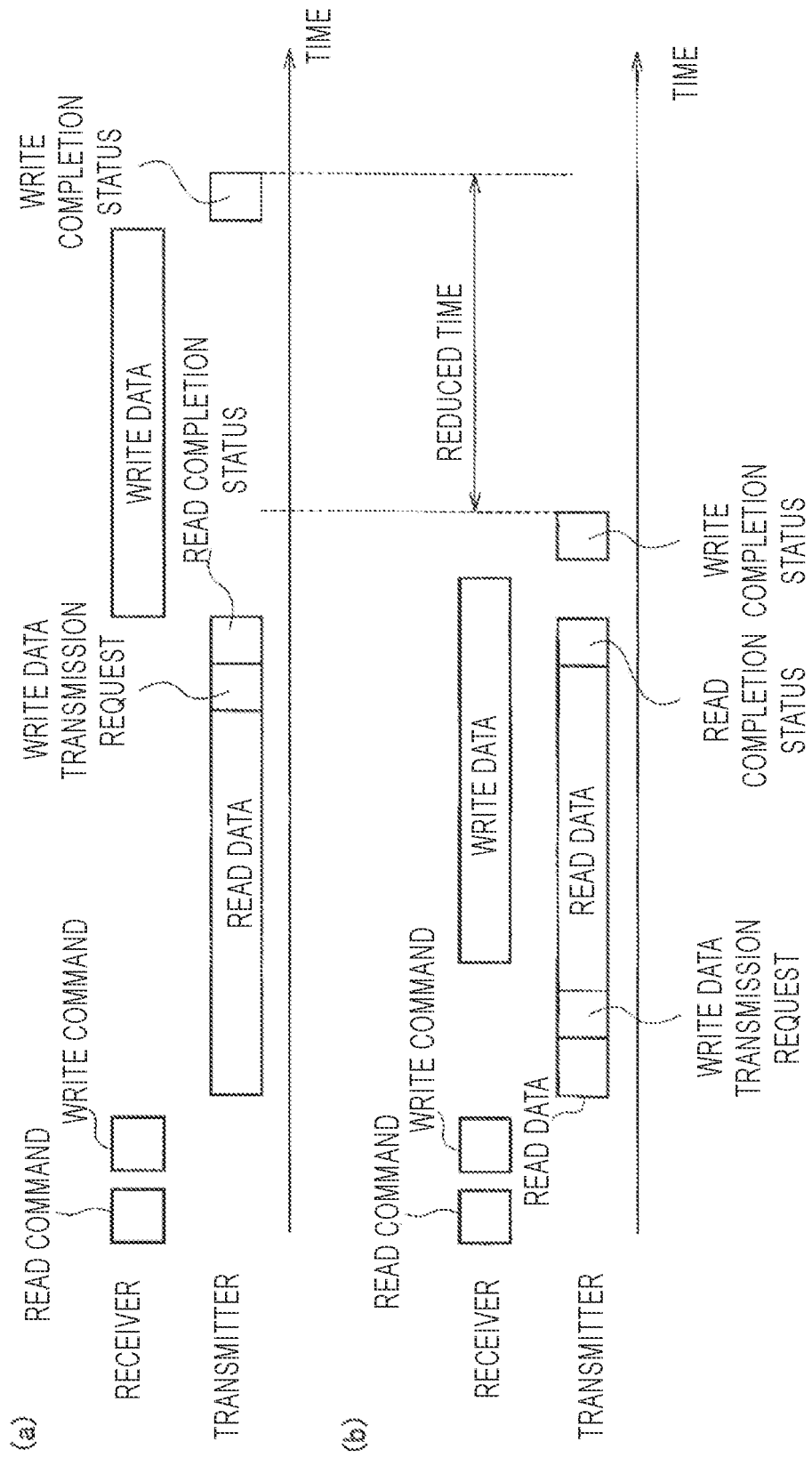
FIG. 7 is a timing diagram illustrating the difference between a data transmitting order in a memory device of related art and a data transmitting order in the memory device of the first embodiment.

In the example illustrated in part (b) of FIG. 7, the receiver 7 of the memory device receives a read command, and then, receives a write command from the host 1. Then, the transmitter 6 transmits a portion of the head of read data to the host 1 in response to the read command.

The CPU 8 generates a packet transmission request in response to the multiple transactions (which include the read command and write command). The transfer packet priority determination unit 15 receives the packet transmission request from the CPU 8, and determines that the write data transmission request needs to be transmitted in preference to the read data, based on the type of the packet included in the header of the transfer packet, with respect to an order of transmitting responses to the multiple transactions.

The transfer queue selector 16 selects the priority transfer queue 14 and stores the write data transmission request in the priority transfer queue 14. Since the write data transmission request is stored in the priority transfer queue 14, the transfer packet selector 17 selects the write data transmission request from the priority transfer queue 14, and transmits the write data transmission request to the host 1. Then, the rest of the read data is transmitted in response to the read command, and the write data is received.

In this way, the control packet such as the write data transmission request is preferentially transmitted, so that transactions such as the write data and the next command UPIU may be received quickly from the host 1. As a result, the time for processing all of the transactions can be reduced.

(Modification 1: Priority Determination Process According to Transfer Packet Length)

In the memory system of the first embodiment, the transfer packet priority determination unit 15 determines whether a transfer packet is a priority packet, based on the type of the transfer packet. In Modification 1, the transfer packet priority determination unit determines that a transfer packet is a priority packet, when the transfer packet length is equal to or less than a threshold, based on the packet size included in the header of the transfer packet.

Figure 8:
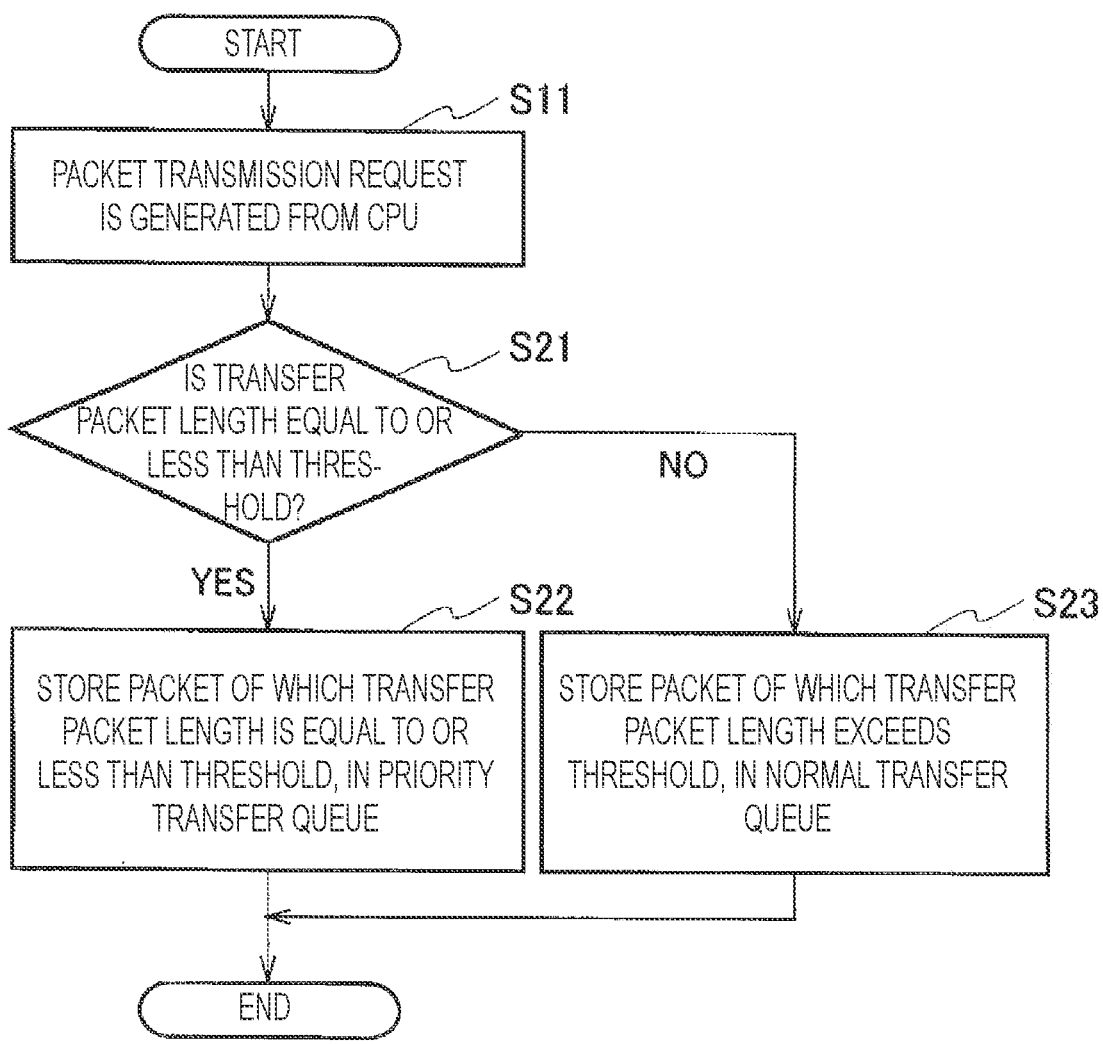
FIG. 8 is a flowchart illustrating a priority transfer process according to a transfer packet length, in the memory controller of the first embodiment.

FIG. 8 illustrates a flowchart of the priority transfer process according to the transfer packet length, in the memory controller of the first embodiment.

First, the transfer packet priority determination unit 15 determines whether the transfer packet length is equal to or less than a threshold (step S21). When it is determined that the transfer packet length is equal to or less than the threshold, the transfer packet priority determination unit 15 selects the priority transfer queue 14, and stores the packet of which the transfer packet length is equal to or less than the threshold in the priority transfer queue 14 (step S22).

Meanwhile, when it is determined that the transfer packet is a normal packet of which the transfer packet length exceeds the threshold, the transfer packet priority determination unit 15 selects the normal transfer queue 13, and stores the packet of which the transfer packet length exceeds the threshold in the normal transfer queue 13 (step S23).

According to the memory system of the embodiment of Modification 1, the packet of which the transfer packet length is equal to or less than the threshold (which is set in advance) is transmitted in preference to other packets, so that the next transactions can be executed quickly.

(Modification 2: Priority Determination Process According to Data Transfer Length of Transaction)

In the memory system of the first embodiment, the transfer packet priority determination unit 15 determines whether a transfer packet is a priority packet, according to the type of the transfer packet. In Modification 2, the transfer packet priority determination unit determines that a transfer packet is a priority packet, when the data transfer length of the transaction is equal to or less than a threshold, based on the transaction size included in the header of the transfer packet.

Figure 9:
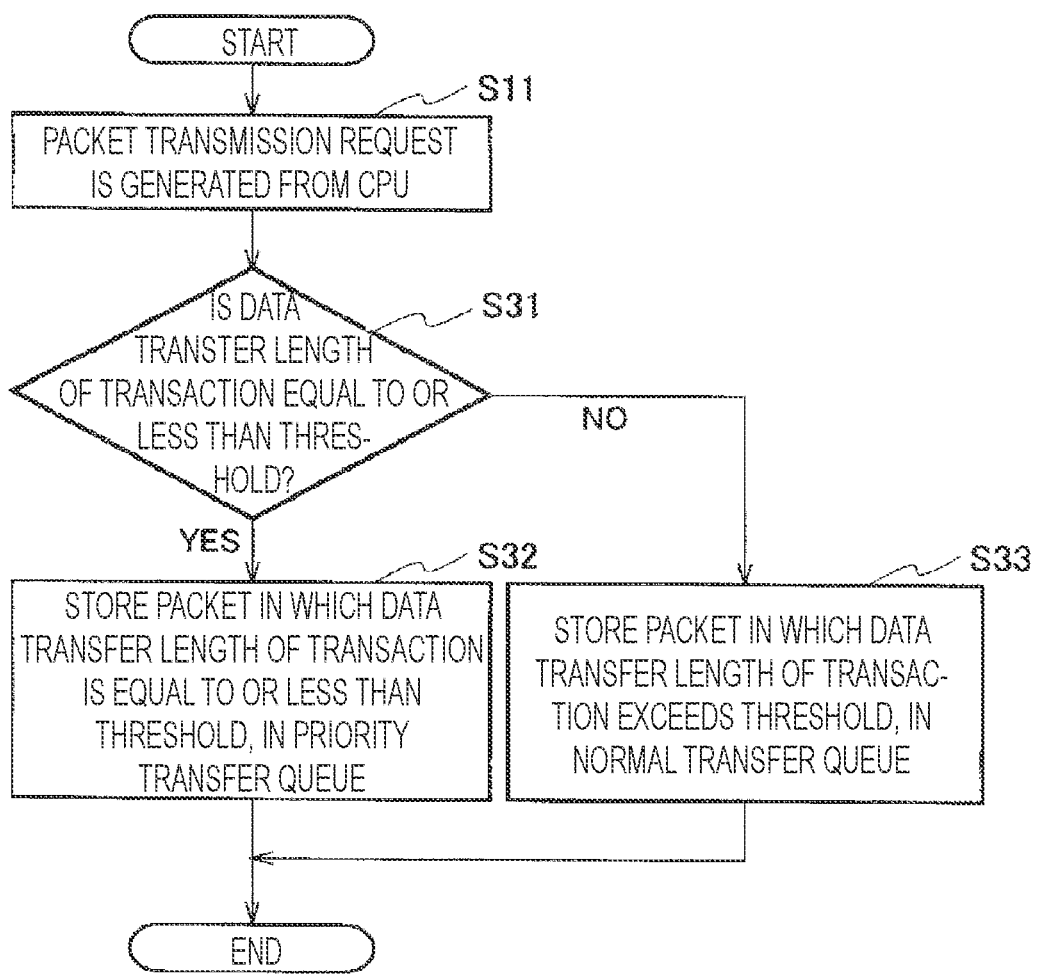
FIG. 9 is a flowchart illustrating a priority transfer process according to a transaction data length, in the memory controller of the first embodiment.

FIG. 9 illustrates a flowchart of the priority transfer process according to the data transfer length of a transaction, in the memory controller of the first embodiment.

First, the transfer packet priority determination unit 15 determines whether the data transfer length of a transaction is equal to or less than the threshold (step S31). When it is determined that the data transfer length of the transaction is equal to or less than the threshold, the transfer packet priority determination unit 15 selects the priority transfer queue 14, and stores the packet in which the data transfer length of the transaction is equal to or less than the threshold in the priority transfer queue 14 (step S32).

Meanwhile, when it is determined that the transfer packet is a normal packet in which the data transfer length of a transaction exceeds the threshold, the transfer packet priority determination unit 15 selects the normal transfer queue 13, and stores the packet in which the data transfer length of a transaction exceeds the threshold in the normal transfer queue 13 (step S33).

According to the memory system of the embodiment of Modification 2, data of the short transaction which is equal to or less than the threshold (which is set in advance) is preferentially transmitted, so that the short transaction may be completed quickly and the next transactions may be executed quickly.

(Modification 3: Priority Determination Process when Read Area is SLC Area)

The memory 4 is able to store one or more bits of data in one cell transistor (cell). A memory element which stores one bit of data per cell transistor as a result of write is called a single-level cell (SLC). A memory element which stores two bits of data per cell transistor is called a multi-level cell (MLC). A memory element which stores three bits of data per cell transistor is called a triple-level cell (TLC). The memory 4 is a memory element of which a data capacity becomes larger according to an increase in the number of bits per cell transistor.

In a NAND flash memory having areas that differ in the amount of time it takes for read/write, such as SLC area and MLC area, data of a transaction in the SLC area in which the time for read/write is relatively fast is preferentially transferred.

Figure 10:
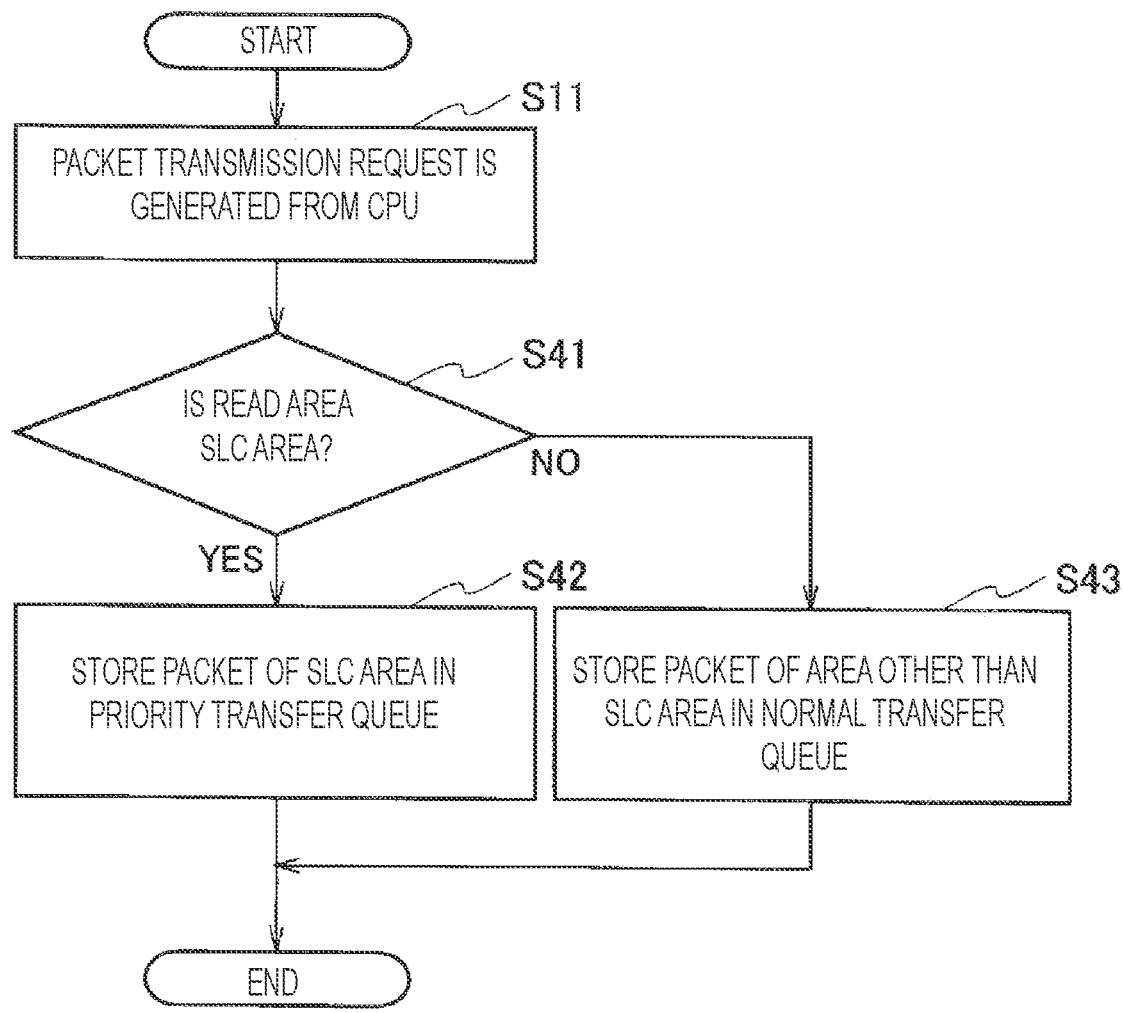
FIG. 10 is a flowchart illustrating a priority transfer process according to a type of a read area of a memory, in the memory controller of the first embodiment.

FIG. 10 illustrates a flowchart of the priority determination process when the read area of the memory 4 of the memory controller 3 in the first embodiment is the SLC area.

First, the transfer packet priority determination unit 15 determines whether the read/write area of the memory 4 is the SLC area, based on the access area of transfer data included in the header of a transfer packet (step S41). When it is determined that the read/write area of the memory 4 is the SLC area, the transfer packet priority determination unit 15 selects the priority transfer queue 14, and stores the packet in which the read/write area of the memory 4 is the SLC area, in the priority transfer queue 14 (step S42).

Meanwhile, when it is determined that the read/write area of the memory 4 is an area other than the SLC area, the transfer packet priority determination unit 15 selects the normal transfer queue 13, and stores the normal packet in which the read/write area of the memory 4 is an area other than the SLC area, in the normal transfer queue 13 (step S43).

According to the memory system of the embodiment of Modification 3, data of the transaction in the SLC area in which the time for read/write is relatively fast is preferentially transferred, so that the next transactions can start execution earlier.

In addition, since the SLC area has a high data retention performance, the SLC area generally stores system data in many cases, and such data is able to be preferentially transferred. Therefore, the transfer packet priority determination unit 15 determines whether a transfer packet is a priority packet, according to the access area of the memory and the type of the accessed area of the memory, such as the SLC area. Alternatively, the transfer packet priority determination unit 15 may determine whether a transfer packet is a priority packet, according to the identification code of the host 1 attached to the header illustrated in FIG. 2.

In addition, the memory system of the embodiments is not limited to the memory system of the first embodiment described above. When the amount of packets stored in the priority transfer queue 14 exceeds a predetermined amount, the transfer packet selector 17 may read packets stored in the normal transfer queue 13 and transfer the read packets to the host 1.

In addition, the time when packets are stored in the priority transfer queue 14 may be counted by a timer, and when the time counted by the timer exceeds a predetermined time, the transfer packet selector 17 may read packets stored in the normal transfer queue 13 and transfer the read packets to the host 1.

In this way, the packets stored in the normal transfer queue 13 may be periodically transferred to the host 1, so that a significant delay in the transfer of the packets stored in the normal transfer queue 13 to the host 1 may be eliminated.

In addition, the memory device of the first embodiment may use the priority determination process according to the type of a transfer packet, the priority determination process according to the transfer packet length, the priority determination process according to the data transfer length of a transaction, and the priority determination process when the read area is the SLC area, in any combination.

Second Embodiment

Figure 11:
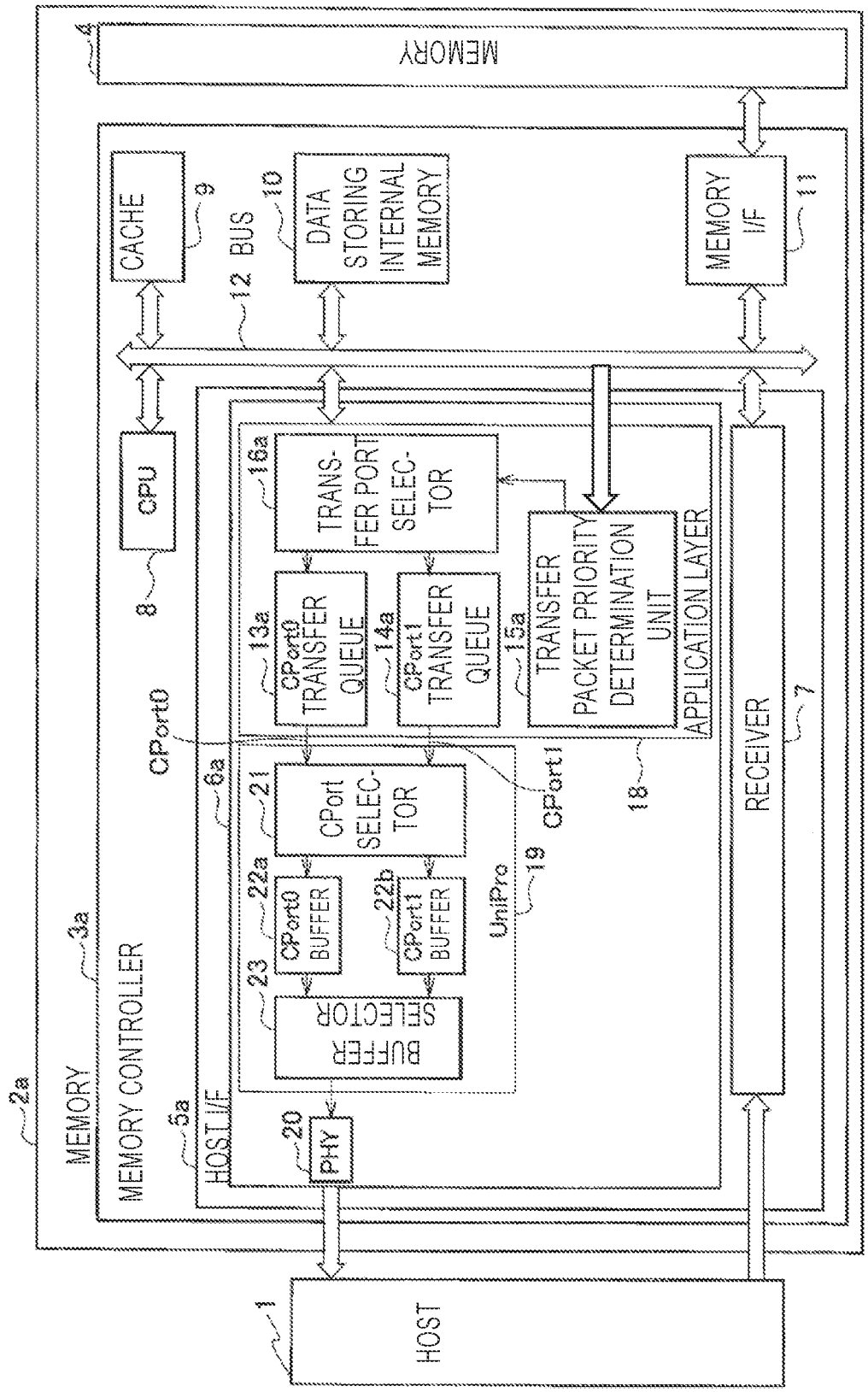
FIG. 11 is a block diagram of a memory controller of a second embodiment.

A memory device 2a of the second embodiment illustrated in FIG. 11 is an example of a UFS device. In the UFS, the UniPro (Unified Protocol) standard is implemented with layers L1.5 to L4 of the Open Systems Interconnection (OSI) reference model.

Figure 12:
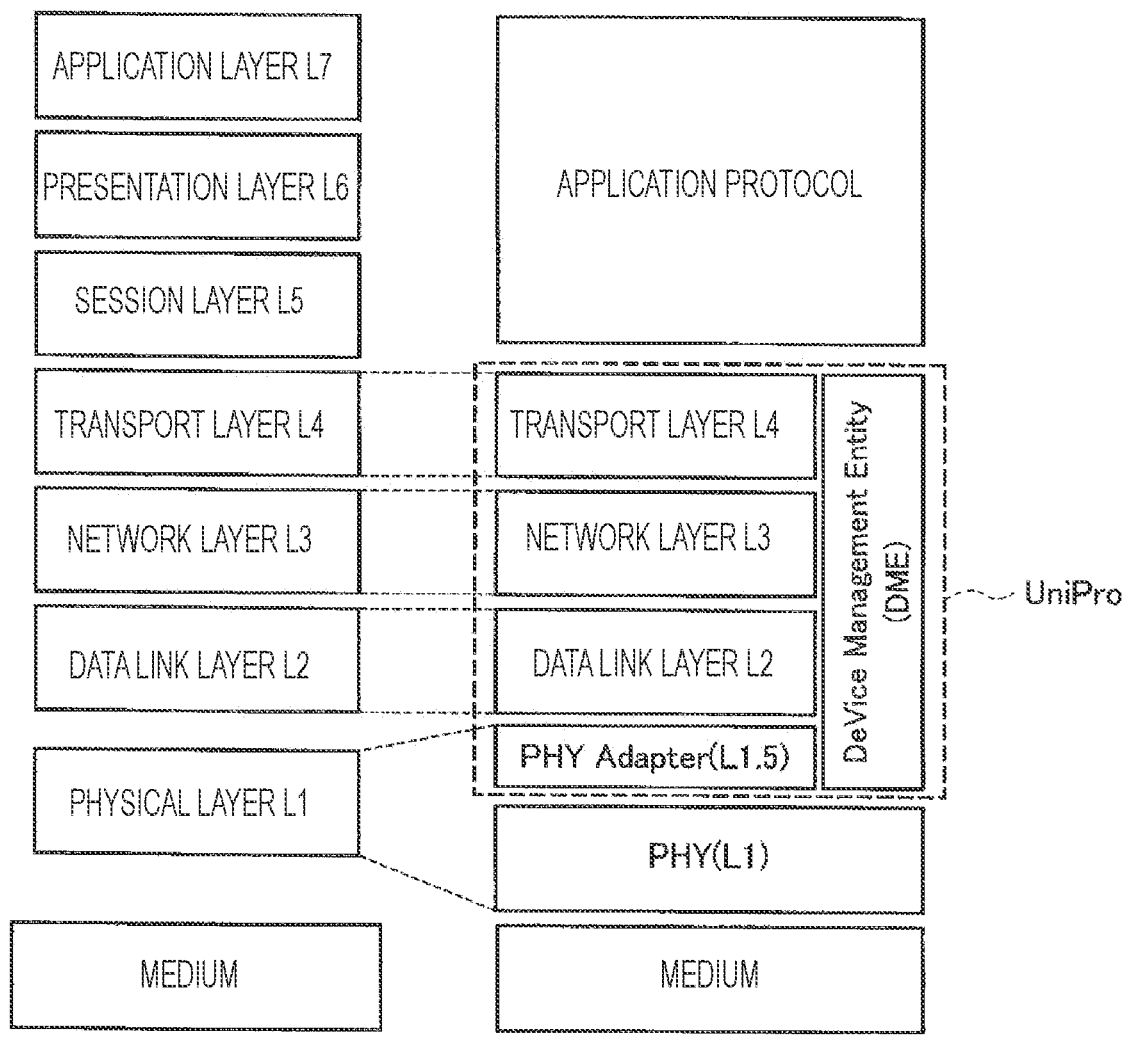
FIG. 12 is a diagram illustrating a Unified Protocol circuit used in the memory controller of the second embodiment.

FIG. 12 is a diagram illustrating the UniPro circuit that is used in the memory controller of the second embodiment. The OSI reference model includes a physical layer L1, a data link layer L2, a network layer L3, a transport layer L4, a session layer L5, a presentation layer L6, and an application layer L7. The UniPro circuit includes a physical adapter L1.5, the data link layer L2, the network layer L3, and the transport layer L4.

An application protocol LA corresponds to the session layer L5, the presentation layer L6, and the application layer L7. The application protocol LA is connected to the UniPro circuit. In addition, the physical adapter L1.5 of the UniPro circuit is connected to the PHY which is the physical layer L1. The PHY is a high-speed serial transfer circuit.

The physical layer L1, the data link layer L2, the network layer L3, the transport layer L4, the session layer L5, the presentation layer L6, and the application layer L7 have functions defined in the OSI reference model.

The memory device 2a illustrated in FIG. 11 includes a memory controller 3a and a memory 4. The memory controller 3a includes a host I/F 5a, a transmitter 6a, a receiver 7, a CPU 8, a cache 9, a data storing internal memory 10, and a memory I/F 11.

The host I/F 5a includes the transmitter 6a that transmits data to the host 1 and the receiver 7 that receives, for example, commands and data from the host 1. The transmitter 6a includes an application layer 18, UniPro circuit 19, and a physical layer (PHY) 20.

In the UniPro circuit 19, a traffic class (TC) is defined to assign a priority of a data transfer. The traffic class TC is an attribute of a packet and may be used to assign a priority to a packet. The priority of a traffic class TC1 is higher than that of a traffic class TC0.

The application layer 18 and the UniPro circuit 19 are connected to each other by an interface called CPort. The CPort is an interface for connecting the UniPro circuit and its upper layer to each other. The traffic class TC is set for each CPort. That is, the traffic class TC0 is set for CPort0 (corresponding to a first CPort), and the traffic class TC1 is set for CPort1 (corresponding to a second CPort).

The application layer 18 includes a Cport0 transfer queue 13a, a CPort1 transfer queue 14a, a transfer packet priority determination unit 15a, and a transfer port selector 16a. The UniPro circuit 19 includes a CPort selector 21, a CPort0 buffer 22a, a CPort1 buffer 22b, and a buffer selector 23. The CPort0 transfer queue 13a corresponds to a first CPort transfer queue. The CPort1 transfer queue 14a corresponds to a second CPort transfer queue.

The CPort0 transfer queue 13a is connected to the CPort0. The CPort1 transfer queue 14a is connected to the CPort1.

In a state where a request for executing multiple transactions is made from the host 1, the transfer packet priority determination unit 15a determines whether a transfer packet is a priority packet that needs to be transmitted preferentially relative to other transfer packets, with respect to an order of transmitting responses to the request for executing multiple transactions.

When the transfer packet is the priority packet, the transfer port selector 16a selects the CPort1 transfer queue 14a, and stores the priority packet in the CPort1 transfer queue 14a. When the transfer packet is not the priority packet, the transfer port selector 16a selects the CPort0 transfer queue 13a, and stores the transfer packet in the CPort0 transfer queue 13a.

When the transfer packet is the priority packet, the CPort selector 21 selects the priority packet stored in the CPort1 transfer queue 14a, and stores the selected priority packet in the CPort1 buffer 22b. When the transfer packet is not the priority packet, the CPort selector 21 selects the transfer packet stored in the CPort0 transfer queue 13a, and stores the selected transfer packet in the CPort0 buffer 22a. The CPort0 buffer 22a corresponds to a first CPort buffer. The CPort 1 buffer 22b corresponds to a second CPort buffer.

When packets are stored in both the CPort0 buffer 22a and the CPort1 buffer 22b, the buffer selector 23 selects the CPort1 buffer 22b and outputs the packet stored in the CPort1 buffer 22b to the PHY 20.

When no packet is stored in the CPort1 buffer 22b, and a packet is stored in the CPort0 buffer 22a, the buffer selector 23 outputs the packet stored in the CPort0 buffer 22a to the PHY 20.

The PHY 20 transmits the packet selected by the buffer selector 23 to the host 1.

As described above, according to the memory controller of the second embodiment, a priority is assigned to a transfer packet by the traffic class TC, so as to set the traffic class TC for each CPort. A packet desired to be preferentially transferred is sent to the CPort1 to which the traffic class TC1 having the relatively high priority is assigned, so that the packet with the traffic class TC1 may be preferentially transferred even during the normal data transfer.

In addition, for the communication layers equal to or lower than the UniPro circuit 19 (layers L1.5 to L4), a transmitting order thereof may be prioritized according to the traffic class TC.

According to the memory controller of at least one of the embodiments described above, in a state where a request for executing multiple transactions is made from the host 1 to the memory device 2, the transfer packet priority determination unit 15 determines whether a transfer packet is a priority packet that needs to be preferentially transmitted, based on the transmission information, with respect to an order of transmitting responds to the multiple transactions.

When the transfer packet is the priority packet, the transfer queue selector 16 selects the priority transfer queue and stores the priority packet in the priority transfer queue. When the transfer packet is not the priority packet, the transfer queue selector 16 selects the normal transfer queue and stores the transfer packet in the normal transfer queue.

When the transfer packet is the priority packet, the transfer packet selector 17 selects the priority packet from the priority transfer queue, and transfers the priority packet to the host. When the transfer packet is not the priority packet, the transfer packet selector 17 selects the transfer packet from the normal transfer queue, and transfers the transfer packet to the host.

That is, a packet that needs to be preferentially transmitted is preferentially transferred according to, for example, the type of a transfer packet and the packet length, so that the time for processing all of the transactions can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory controller comprising:
   a memory interface connectable to a nonvolatile memory;
   a host interface connectable to a host; and
   a processor configured to:
      control the memory interface to transmit write data to the nonvolatile memory and receive read data from the nonvolatile memory based on commands received from the host through the host interface; and
      control the host interface to transmit, to the host, transfer packets, each including at least one of the read data or data generated in the memory controller, wherein
   the host interface includes a first transfer queue, a second transfer queue, a first buffer, and a second buffer,
   the host interface is configured to:
      determine whether or not a transfer packet to be transmitted to the host is a priority packet,
      store a corresponding packet data in an application layer in the first transfer queue, upon determining that the transfer packet is a priority packet,
      store the corresponding packet data in the application layer in the second transfer queue, upon determining that the transfer packet is not a priority packet,
      store a priority packet, which includes the corresponding packet data in the application layer stored in the first transfer queue and data in a transport layer, a network layer, and a data link layer, in the first buffer,
      store a non-priority packet, which includes the corresponding packet data in the application layer stored in the second transfer queue and data in the transport layer, the network layer, and the data link layer, in the second buffer, and
      transmit priority packets in the first buffer with prioritization over non-priority packets in the second buffer, to the host.

2. The memory controller according to claim 1, wherein the host interface is configured to:
   transmit one or more priority packets in the first buffer to the host, when at least one priority packet is stored in the first buffer, and
   transmit one or more non-priority packets in the second buffer to the host when no priority packet is stored in the first buffer.

3. The memory controller according to claim 1, wherein a header of the priority packet includes data specifying a first traffic class for packet transfer, and a header of the non-priority packet includes data specifying a second traffic class for packet transfer, the second traffic class being lower in priority than the first traffic class.

4. The memory controller according to claim 1, wherein the host interface is configured to determine whether or not the transfer packet to be transmitted to the host is a priority packet based on a type of the transfer packet.

5. The memory controller according to claim 1, wherein the host interface is configured to determine that the transfer packet to be transmitted to the host is a priority packet when the transfer packet includes a data transmission request to the host, and that the transfer packet to be transmitted to the host is a non-priority packet when the transfer packet includes status data of write or read completion, and does not include the data transmission request.

6. The memory controller according to claim 1, wherein the host interface is configured to determine whether or not the transfer packet to be transmitted to the host is a priority packet based on a length of the transfer packet being less than or equal to a threshold.

7. The memory controller according to claim 1, wherein the host interface is configured to determine whether or not the transfer packet to be transmitted to the host is a priority packet based on a data transfer length of one of the transactions corresponding to the transfer packet being less than or equal to a threshold.

8. The memory controller according to claim 1, wherein the host interface is configured to determine whether or not the transfer packet to be transmitted to the host is a priority packet according to a type of a read area of the nonvolatile memory device.

9. The memory controller according to claim 1, wherein the host interface is configured to determine whether or not the transfer packet to be transmitted to the host is a priority packet according to an access area of the nonvolatile memory device.

10. The memory controller according to claim 1, wherein the host interface is configured to determine whether or not the transfer packet to be transmitted to the host is a priority packet according to an identification code of the host.

11. A memory system comprising:
    a nonvolatile memory; and
    a memory controller comprising:
       a memory interface connected to the nonvolatile memory;
       a host interface connectable to a host; and
       a processor configured to:
          control the memory interface to transmit write data to the nonvolatile memory and receive read data from the nonvolatile memory based on commands received from the host through the host interface; and
          control the host interface to transmit, to the host, transfer packets, each including at least one of the read data or data generated in the memory controller, wherein the host interface includes a first transfer queue, a second transfer queue, a first buffer, and a second buffer, the host interface is configured to:
- determine whether or not a transfer packet to be transmitted to the host is a priority packet,
- store a corresponding packet data in an application layer in the first transfer queue, upon determining that the transfer packet is a priority packet,
- store the corresponding packet data in the application layer in the second transfer queue, upon determining that the transfer packet is not a priority packet,
- store a priority packet, which includes the corresponding packet data in the application layer stored in the first transfer queue and data in a transport layer, a network layer, and a data link layer, in the first buffer,
- store a non-priority packet, which includes the corresponding packet data in the application layer stored in the second transfer queue and data in the transport layer, the network layer, and the data link layer, in the second buffer, and
- transmit priority packets in the first buffer with prioritization over non-priority packets in the second buffer, to the host.

12. The memory system according to claim 11, wherein the host interface is configured to:
- transmit one or more priority packets in the first buffer to the host, when at least one priority packet is stored in the first buffer, and
- transmit one or more non-priority packets in the second buffer to the host when no priority packet is stored in the first buffer.

13. The memory system according to claim 11, wherein a header of the priority packet includes data specifying a first traffic class for packet transfer, and a header of the non-priority packet includes data specifying a second traffic class for packet transfer, the second traffic class being lower in priority than the first traffic class.

14. The memory system according to claim 11, wherein the host interface is configured to determine whether or not the transfer packet to be transmitted to the host is a priority packet based on a type of the transfer packet.

15. The memory system according to claim 11, wherein the host interface is configured to determine that the transfer packet to be transmitted to the host is a priority packet when the transfer packet includes a data transmission request to the host, and that the transfer packet to be transmitted to the host is a non-priority packet when the transfer packet includes status data of write or read completion, and does not include the data transmission request.

16. The memory system according to claim 11, wherein the host interface is configured to determine whether or not the transfer packet to be transmitted to the host is a priority packet based on a length of the transfer packet being less than or equal to a threshold.

17. The memory system according to claim 11, wherein the host interface is configured to determine whether or not the transfer packet to be transmitted to the host is a priority packet based on a data transfer length of one of the transactions corresponding to the transfer packet being less than or equal to a threshold.

18. The memory system according to claim 11, wherein the host interface is configured to determine whether or not the transfer packet to be transmitted to the host is a priority packet according to a type of a read area of the nonvolatile memory device.

19. The memory system according to claim 11, wherein the host interface is configured to determine whether or not the transfer packet to be transmitted to the host is a priority packet according to an access area of the nonvolatile memory device.

20. The memory system according to claim 11, wherein the host interface is configured to determine whether or not the transfer packet to be transmitted to the host is a priority packet according to an identification code of the host.

* * * * *